(12) United States Patent
Ghiasi et al.

(10) Patent No.: US 12,446,807 B2
(45) Date of Patent: Oct. 21, 2025

(54) TRANSABDOMINAL FETAL OXIMETRY WITHOUT EXPLICIT FETAL SIGNAL EXTRACTION

(71) Applicant: The Regents of the University of California, Oakland, CA (US)

(72) Inventors: Soheil Ghiasi, Davis, CA (US); Daniel Fong, Davis, CA (US); Kourosh Vali, Davis, CA (US); Begum Kasap, Davis, CA (US); Weitai Qian, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 754 days.

(21) Appl. No.: 17/827,628

(22) Filed: May 27, 2022

(65) Prior Publication Data
US 2022/0378334 A1   Dec. 1, 2022

Related U.S. Application Data

(60) Provisional application No. 63/193,913, filed on May 27, 2021.

(51) Int. Cl.
*A61B 5/1464*   (2006.01)
*A61B 5/00*   (2006.01)
(Continued)

(52) U.S. Cl.
CPC .......... *A61B 5/1464* (2013.01); *A61B 5/0205* (2013.01); *A61B 5/14551* (2013.01); *A61B 5/7267* (2013.01)

(58) Field of Classification Search
CPC . A61B 5/1464; A61B 5/0205; A61B 5/14551; A61B 5/7267; A61B 5/6823; A61B 2503/02
See application file for complete search history.

(56) References Cited

U.S. PATENT DOCUMENTS 9,179,876 B2 * 11/2015 Ochs .................... A61B 5/7203
11,419,530 B2 * 8/2022 Ray ...................... A61B 5/4356
(Continued)

*Primary Examiner* — Eric F Winakur
*Assistant Examiner* — Noah M Healy
(74) *Attorney, Agent, or Firm* — Park, Vaughan, Fleming & Dowler LLP

(57) ABSTRACT

This disclosure provides a fetal-blood-oxygen-saturation estimation technique using a deep neural network without performing explicit fetal signal extraction from mixed maternal-fetal photoplethysmogram (PPG) signals. In one aspect, the disclosed fetal-blood-oxygen-saturation estimation technique receives multiple channels of PPG signals from two or more photodetectors detecting transabdominal diffused light from two or more light sources emitting two or more distinct wavelengths, wherein the photodetectors and light sources are positioned on a maternal abdomen. Note that each channel of the multiple channels of PPG signals includes mixed maternal-fetal PPG signals. Next, the disclosed estimation technique processes the received PPG signals using a trained deep neural network to directly estimate fetal-blood-oxygen-saturation by: tagging the PPG signals with a set of signal-quality levels; feeding the tagged PPG signals as inputs to the deep neural network; and directly inferring, by the deep neural network, fetal-blood-oxygen-saturation estimations and associated confidence levels based on the tagged PPG signals.

29 Claims, 5 Drawing Sheets

(51) Int. Cl.
  *A61B 5/0205* (2006.01)
  *A61B 5/1455* (2006.01)

(56) References Cited

U.S. PATENT DOCUMENTS

| | | | |
|---|---|---|---|
| 2011/0092824 A1* | 4/2011 | Veen | A61B 5/14551 |
| | | | 600/477 |
| 2013/0303921 A1* | 11/2013 | Chu | A61B 5/0059 |
| | | | 600/476 |
| 2020/0214603 A1* | 7/2020 | Ghiasi | A61B 5/1464 |
| 2020/0315475 A1* | 10/2020 | Huang | A61B 5/7246 |
| 2021/0193311 A1* | 6/2021 | Addison | A61B 5/7267 |
| 2022/0015713 A1* | 1/2022 | Kaminsky | G06N 20/00 |
| 2022/0287653 A1* | 9/2022 | Ray | A61B 5/746 |
| 2024/0206781 A1* | 6/2024 | Nissim | A61B 5/02416 |

\* cited by examiner

TRANSABDOMINAL FETAL OXIMETRY WITHOUT EXPLICIT FETAL SIGNAL EXTRACTION

CROSS-REFERENCE TO RELATED APPLICATION

This application claims the benefit of U.S. Provisional Patent Application Ser. No. 63/193,913, entitled "Advancements For A Transabdominal Fetal Pulse Oximetry Device," filed on 27 May 2021, the contents of which are incorporated by reference herein.

GOVERNMENT LICENSE RIGHTS

This invention was made with U.S. government support under grant number 1838939 awarded by the National Science Foundation and grant number R21HD097467 awarded by the National Institutes of Health. The U.S. government has certain rights in the invention.

BACKGROUND

Field

The disclosed embodiments generally relate to non-invasive techniques for monitoring the health of a fetus in utero. More specifically, the disclosed embodiments relate to a non-invasive transabdominal fetal pulse oximetry (TFO) implementation for monitoring fetal blood oxygen saturation (fetal $S_pO_2$) using a deep-learning-based signal processing technique.

Related Art

Assessing fetal well-being during labor is an important indicator of whether any medical intervention, such as a caesarean section (C-section) or an instrumental vaginal delivery, may be needed. During assessment, one critical parameter to evaluate fetal well-being is the oxygen saturation level of the fetus. Transabdominal fetal oximetry has great significance in medical care in obstetrics. It can non-invasively measure the blood oxygen saturation in the fetus through the maternal abdomen, and provide an important assessment to intrapartum fetal health and early detection of fetal hypoxia.

Transabdominal fetal pulse oximetry (TFO) can allow physicians to reliably detect fetal hypoxic distress intrapartum, especially when the fetal heart rate traces captured by existing electronic fetal monitors are deemed indeterminate. Measurement of blood oxygen saturation in single-body patients is presently possible through conventional pulse oximetry. However, since TFO leverages light propagation through maternal and fetal tissue and sensing the diffused light by optical photodetectors placed on the maternal abdomen, it is considerably more challenging than conventional pulse oximetry. Existing TFO solutions determine fetal blood oxygen saturation (fetal $S_pO_2$) in a pregnant patient by extracting fetal signals from the mixed TFO signals containing both maternal and fetal signals using signal processing techniques and subsequently solving numerical equations. However, performing fetal signal extraction from the acquired mixed signals is a very challenging task because the fetal signal is generally very weak and the mixed maternal-fetal PPG signal is inherently noisy.

Hence, what is needed is a more accurate and low-cost technique for measuring fetal blood oxygen saturation without the drawbacks of existing techniques.

SUMMARY

This disclosure provides a fetal-blood-oxygen-saturation estimation technique using a deep neural network without performing explicit fetal signal extraction from mixed maternal-fetal photoplethysmogram (PPG) signals.

In one aspect, a process for estimating fetal blood oxygen saturation is disclosed. The process can start by receiving PPG signals from two or more photodetectors detecting transabdominal diffused light from two or more light sources emitting two or more distinct wavelengths, wherein the two or more photodetectors and the two or more light sources are positioned on a maternal abdomen. Note that the PPG signals include mixed maternal-fetal PPG signals. Next, the received PPG signals are processed using a deep neural network trained on a set of PPG training samples to directly estimate fetal blood oxygen saturation.

In some embodiments, each of the two or more light sources are modulated on and off at a distinct switching frequency different from other switching frequencies used to modulate other light sources.

In some embodiments, prior to processing the received PPG signals, the process further includes f extracting two or more channels of PPG signals from the received PPG signals based on the corresponding switching frequencies. Note that each extracted channel of PPG signals is associated with one of the two or more distinct wavelengths.

In some embodiments, after extracting the two or more channels of PPG signals, the process further includes: (1) dividing each of the two or more channels of PPG signals into a sequence of data windows; and (2) determining a signal quality level among a set of predetermined signal-quality levels for each data window in the sequence of data windows.

In some embodiments, the set of predetermined signal-quality levels includes at least the following three levels: "Weak," "Medium," and "Good."

In some embodiments, prior to processing the received PPG signals using the deep neural network, the process further includes tagging the sequence of data windows with the corresponding determined signal-quality levels.

In some embodiments, processing the received PPG signals using the deep neural network includes: (1) feeding the tagged data windows of the two or more channels of PPG signals as inputs to the deep neural network; and (2) directly inferring, by the deep neural network, a first sequence of fetal-blood-oxygen-saturation estimations and associated confidence levels corresponding to the first sequence of fetal oxygen saturation estimations as outputs.

In some embodiments, the deep neural network was trained on a group of patients with known fetal-blood-oxygen-saturation values and using the same transabdominal fetal pulse oximetry (TFO) sensing configuration as the TFO sensing configuration used to acquire the PPG signals. Moreover, training the deep neural network includes applying the same set of predetermined signal-quality levels as tags to the set of PPG training samples.

In some embodiments, prior to feeding the tagged data windows to the deep neural network, the process can additionally involve: (1) detecting that a set of consecutive data windows are tagged with a low signal-quality level among the set of predetermined signal-quality levels; and (2) computing an average of the set of consecutive data windows as an enhanced input to the deep neural network to replace the set of consecutive data windows.

In some embodiments, the process computes the average of the set of consecutive data windows by providing increasingly lower weights to increasingly older data windows in the set of consecutive data windows.

In some embodiments, the process additionally receives a second sequence of fetal-blood-oxygen-saturation estimations corresponding to the sequence of tagged data windows generated using a conventional fetal-blood-oxygen-saturation estimation technique applied on the PPG signals. Next, the process generates a final sequence of fetal-blood-oxygen-saturation estimations corresponding to the sequence of tagged data windows by computing the weighted averages of the first sequence and second sequence of fetal-blood-oxygen-saturation estimations.

In some embodiments, the process computes the weighted average of the first sequence and second sequence of fetal-blood-oxygen-saturation estimations by using the associated confidence levels of the first sequence of fetal-blood-oxygen-saturation estimations as weight factors to the first sequence of fetal-blood-oxygen-saturation estimations within the weighted averages.

In some embodiments, generating the first sequence of fetal-blood-oxygen-saturation estimations corresponding to the sequence of tagged data windows using the deep neural network does not require performing fetal signal extraction from the mixed PPG signals. In contrast, generating the second sequence of fetal-blood-oxygen-saturation estimations corresponding to the sequence of tagged data windows using the conventional fetal-blood-oxygen-saturation estimation technique requires performing fetal signal extraction from the mixed PPG signals.

In some embodiments, processing the received PPG signals using the deep neural network to directly estimate fetal blood oxygen saturation includes using the deep neural network to directly infer, from the received PPG signals, changes in fetal-blood-oxygen-saturation level with respect to a baseline fetal-blood-oxygen-saturation level when the fetus is in a healthy state.

In some embodiments, prior to using the deep neural network to infer the changes in fetal-blood-oxygen-saturation level with respect to the baseline fetal-blood-oxygen-saturation level, the process further includes calibrating the deep neural network based on the PPG signals received during the healthy state of the fetus before an active phase of labor of the mother until the deep neural network outputs substantially zero values.

In another aspect, a transabdominal fetal pulse oximetry (TFO) system that uses a deep neural network to process photoplethysmogram (PPG) signals is disclosed. The TFO system includes a TFO sensing configuration positioned on a maternal abdomen, wherein the TFO sensing configuration includes: (1) two or more light sources emitting two or more distinct wavelengths; and (2) two or more photodetector detecting transabdominal diffused light from the two or more light sources. The TFO system also includes a TFO signal processing module coupled to the TFO sensing configuration. This TFO signal processing module is configured to: (1) receive photoplethysmogram (PPG) signals from the set of photodetectors, wherein the PPG signals includes mixed maternal-fetal PPG signals; and (2) process the received PPG signals using a deep neural network trained on a set of PPG training samples to directly estimate fetal blood oxygen saturation.

In some embodiments, each of the two or more light sources are modulated on and off at a distinct switching frequency different from other switching frequencies used to modulate other light sources.

In some embodiments, prior to processing the received PPG signals, the TFO signal processing module is further configured to extract two or more channels of PPG signals from the received PPG signals based on the corresponding switching frequencies, wherein each extracted channel of PPG signals is associated with one of the two or more distinct wavelengths.

In some embodiments, after extracting the two or more channels of PPG signals, the TFO signal processing module is further configured to: (1) divide each of the two or more channels of PPG signals into a sequence of data windows; and (2) determine a signal quality level among a set of predetermined signal-quality levels for each data window in the sequence of data windows. In some embodiments, the set of predetermined signal-quality levels includes at least the following three levels: "Weak," "Medium," and "Good."

In some embodiments, prior to processing the received PPG signals using the deep neural network, the TFO signal processing module is further configured to tag the sequence of data windows with the corresponding determined signal-quality levels.

In some embodiments, the TFO signal processing module processes the received PPG signals using the deep neural network by: (1) feeding the tagged data windows of the two or more channels of PPG signals as inputs to the deep neural network; and (2) directly inferring, by the deep neural network, a first sequence of fetal-blood-oxygen-saturation estimations and associated confidence levels corresponding to the fetal oxygen saturation estimations as outputs.

In some embodiments, the TFO system further includes a model training module configured to train the deep neural network on a group of patients with known fetal-blood-oxygen-saturation values and using the same TFO sensing configuration as the TFO sensing configuration used to acquire the PPG signals. Moreover, the model training module is configured to train the deep neural network by applying the same set of predetermined signal-quality levels as tags to the set of PPG training samples.

In some embodiments, prior to feeding the tagged data windows to the deep neural network, the TFO signal processing module is further configured to: (1) detect that a set of consecutive data windows are tagged with a low signal-quality level among the set of predetermined signal-quality levels; and (2) compute an average of the set of consecutive data windows as an enhanced input to the deep neural network to replace the set of consecutive data windows.

In some embodiments, the TFO signal processing module is configured to compute the average of the set of consecutive data windows by giving increasingly lower weights to increasingly older data windows in the set of consecutive data windows.

In some embodiments, the TFO signal processing module is further configured to: (1) receive a second sequence of fetal-blood-oxygen-saturation estimations corresponding to the sequence of tagged data windows generated using a conventional fetal-blood-oxygen-saturation estimation technique applied on the PPG signals; and (2) generate a final sequence of fetal-blood-oxygen-saturation estimations corresponding to the sequence of tagged data windows by computing the weighted averages of the first sequence and second sequence of fetal-blood-oxygen-saturation estimations.

In some embodiments, the TFO signal processing module is further configured to compute the weighted average of the first and second sequences of fetal-blood-oxygen-saturation estimations by using the associated confidence levels of the first sequence of fetal-blood-oxygen-saturation estimations as weight factors to the first sequence of fetal-blood-oxygen-saturation estimations within the weighted averages.

In some embodiments, the TFO signal processing module is configured to generate the first sequence of fetal-blood-oxygen-saturation estimations using the deep neural network without performing fetal signal extraction from the mixed PPG signals. In contrast, the TFO signal processing module is configured to generate the second sequence of fetal-blood-oxygen-saturation estimations using the conventional fetal-blood-oxygen-saturation estimation technique by performing fetal signal extraction from the mixed PPG signals.

In some embodiments, the TFO signal processing module is configured to process the received PPG signals by using the deep neural network to directly infer, from the received PPG signals, changes in fetal-blood-oxygen-saturation level with respect to a baseline fetal-blood-oxygen-saturation level when the fetus is in a healthy state.

In some embodiments, prior to using the deep neural network to infer the changes in fetal-blood-oxygen-saturation level, the TFO signal processing module is further configured to calibrate the deep neural network based on the PPG signals received during the healthy state of the fetus before an active phase of labor of the mother until the deep neural network outputs substantially zero values.

DETAILED DESCRIPTION

Figure 1:
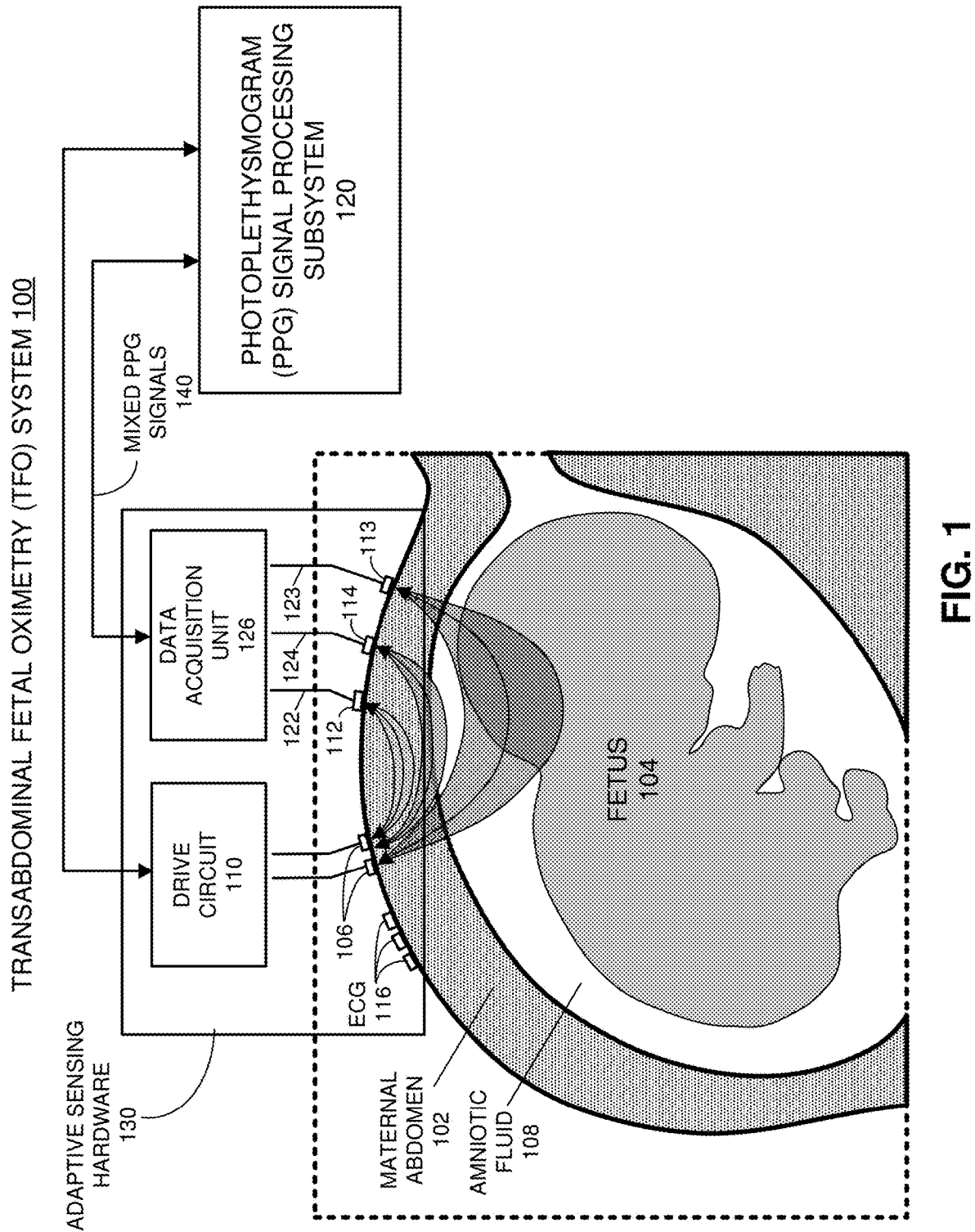
FIG. 1 illustrates a transabdominal fetal pulse oximetry (TFO) system in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

This disclosure provides various fetal-blood-oxygen-saturation estimating techniques based on a transabdominal fetal oximetry (TFO) system that includes both adaptive and reconfigurable sensing hardware (or simply "adaptive sensing hardware") and a deep-learning-based signal processing subsystem. In various embodiments, the adaptive sensing hardware includes two or more switching light sources emitting two or more distinct wavelengths, wherein each light source is switched on and off at a distinct switching frequency. The adaptive sensing hardware also includes a set of photodetectors to detect transabdominal diffused light from the two or more light sources and generate mixed maternal-fetal photoplethysmogram (PPG) signals. The signal processing subsystem includes a signal quality evaluation module that continuously evaluates the qualities of the received PPG signals, and generates feedback to the adaptive sensing hardware when the received PPG signals are deemed to be of low quality. This active feedback mechanism causes components in the adaptive sensing hardware to be judiciously adjusted, such as by changing the switching frequencies of the light sources, placement of the photodetectors, and/or the signal gains. In this manner, the PPG signal sensing configuration can be adaptively adjusted until the received PPG signals have acceptable signal qualities, which allows the accuracies of the downstream fetal-blood-oxygen-saturation estimations to be significantly improved.

The signal processing subsystem further includes a deep-learning-based fetal-blood-oxygen-saturation (or "fetal $SO_2$")$_p$ estimator. In various embodiments, the received mixed PPG signals are separated into different wavelength channels (based on the source wavelength), and each channel of mixed PPG signal is further divided into a sequences of data window. Each data window is tagged with a signal quality index (SQI) label by the signal quality evaluation module, and the tagged data windows of the multiple channels of mixed PPG signals are fed to the fetal $S_pO_2$ estimator. The fetal $S_pO_2$ estimator uses a trained deep neural network to directly infer a sequence of fetal $S_pO_2$ estimations and confidence levels corresponding to the sequence of fetal $S_pO_2$ estimations as outputs. In this manner, real-time fetal $S_pO_2$ estimations can be generated from mixed PPG signals without explicitly extracting the fetal signals from the mixed maternal-fetal PPG signals and solving fetal $S_pO_2$ diffusion equations. As a result, the disclosed fetal $S_pO_2$ estimator effectively eliminates any challenge and difficulty in extracting weak fetal signals from noisy PPG signals faced by the conventional fetal-blood-oxygen-saturation techniques.

Fetal Pulse Oximetry

Pulse oximetry is a classic method to estimate arterial blood oxygen saturation ($SaO_2$) levels of a patient. $SaO_2$ is the percentage of oxyhemoglobin [$HbO_2$] to the total functional hemoglobin (oxy- [$HbO_2$] and deoxyhemoglobin [Hb]). $SaO_2$ values measured by a pulse oximeter are generally denoted as $S_pO_2$. Transabdominal Fetal pulse Oximetry (TFO) uses light-based measurements to non-invasively determine fetal blood oxygen saturation (fetal $S_pO_2$) in a pregnant patient. TFO operates by continuously shining pulsating near-infrared light through the maternal abdomen in a process known as Continuous Wave Near-Infrared Spectroscopy (CWNIRS), wherein the near-infrared light propagates through the maternal tissues to reach the underlying fetal vascular tissues, such as a fetal artery. At each maternal or fetal pulsation/cardiac cycle, a slight expansion of arterial vessels of the mother or the fetus results in an increase to the blood volume and hence an increase of the blood-tissue volume ratio. These subtle geometrical changes in the vascular tissues cause transcutaneous light-intensity variations. The diffused lights carrying light-intensity variations caused by the changes in the blood-tissue volume ratio are captured with photodetectors into a resulting photoplethysmogram (PPG) signal.

FIG. 1 illustrates a transabdominal fetal pulse oximetry (TFO) system 100 in accordance with the disclosed embodiments. TFO system 100 includes two or more light sources 106 that emit probe lights at two or more wavelengths. Note that the two or more light sources 106 can be implemented with two or more light-emitting diodes (LEDs) or two or more laser diodes. For simplicity and clarity of discussion, only two light sources 106 are illustrated which emit light at two distinct wavelengths $\lambda_1$ and $\lambda_2$. Typically, wavelengths $\lambda_1$ and $\lambda_2$ at red and near-infrared (NIR) regions of light, respectively are chosen. However, additional light sources 106 at additional wavelengths can be used in TFO system 100 without departing from the scope of the disclosed embodiments.

As illustrated in FIG. 1, light sources 106 are positioned on the surface of a maternal abdomen 102 to direct the probe lights through the layer of maternal abdomen 102 and amniotic fluid 108 toward a fetus 104. Note that light sources 106 are powered by a drive circuit 110 to emit probe lights at wavelengths $\lambda_1$ and $\lambda_2$. Moreover, drive circuit 110 also modulates the two light sources 106 on and off at two distinct modulation/switching frequencies $f_1$ and $f_2$, respectively. As such, light sources 106 are switching light sources and the probe lights are pulsed lights. Drive circuit 110 is coupled to and under the control of a TFO signal processing subsystem 120. As will be discussed in more detail below, drive circuit 110 can adaptively adjust the switching frequencies $f_1$ and $f_2$ under the control of signal processing subsystem 120.

TFO system 100 includes two or more photodetectors positioned on the surface of maternal abdomen 102 at some distances from light sources 106. Specifically, a first photodetector (PD) 112 is positioned closer to light sources 106 to receive diffused-reflected light that traverses maternal tissues in maternal abdomen 102, and in response to produce a maternal photoplethysmogram (PPG) signal 122. A second PD 113 is positioned further away from light sources 106 to receive diffused-reflected light that traverses both maternal tissues in maternal abdomen 102 and fetal tissues in a fetus 104, and in response, produces a maternal-fetus PPG signal 123 comprising contributions from both the maternal and fetal tissues. Note that the received diffused-reflected light results from the probe light that penetrates through material abdomen 102 and amniotic fluid 108 to reach fetus 104. TFO system 100 can optionally include a third PD 114 positioned between PD 112 and PD 113 to receive diffused-reflected light that traverses the boundary region between material abdomen 102 and fetus 104, and in response, produces a third PPG signal 124 comprising contributions from both the maternal tissues and the amniotic fluid. In addition to optical sensing components such as photodetectors 112-114, TFO system 100 can also include other types of physiological data sensors, including an electrocardiogram (ECG) 116 for non-invasively acquiring ECG signals (e.g., a mixture of maternal and fetal ECG signals) using multiple ECG patches attached to the maternal skin.

The PPG signals 122-124 from photodetectors 112-114 are fed to a data acquisition unit 126 that includes a current-to-voltage conversion circuitry, which converts the received PPG signals from photodetectors 112-114 into voltage signals; and an analog-to-digital (A/D) converter, which converts the analog voltage signals into multiple sequences of digital samples (i.e., multiple time-series signals). Note that these time-series voltage signals include mixed PPG signals generated by two or more photodetectors and contributions from both maternal abdomen 102 and fetus 104. Moreover, each time series signal also includes contributions from two or more switching light sources emitting at the two or more wavelengths. Hence, we refer to the multiple time-series voltage signals output from data acquisition unit 126 as mixed PPG signals 140.

The mixed PPG signals 140 are then fed into a PPG signal processing subsystem 120 (or "signal processing subsystem 120"), which performs disclosed transabdominal fetal oximetry estimations to determine fetal $S_pO_2$ by analyzing the received mixed PPG signals 140. Specifically, signal processing subsystem 120 includes a direct fetal $S_pO_2$ estimator that comprises various processing modules operating collectively to generate a continuous sequence of fetal $S_pO_2$ estimations without performing explicit fetal PPG signal extractions from mixed maternal-fetal PPG signals 140. However, signal processing subsystem 120 can include a separate fetal $S_pO_2$ estimator capable of performing fetal $S_pO_2$ computations using a conventional fetal PPG signal extraction technique.

Note that the couplings between signal processing subsystem 120 and each of drive circuit 110 and data acquisition unit 126 are both shown as bi-directional. This is because signal processing subsystem 120 includes a feedback mechanism that can cause the sensing hardware (including light sources 106 and photodetectors 112-114) to be dynamically adjusted based on the quality of the received mixed PPG signals 140. In various embodiments, the dynamic adjustments to the sensing hardware can include changing the switching frequencies $f_1$ and $f_2$ and/or changing the placement locations and/or signal gains of photodetectors 112-114. Because drive circuit 110 generates the updated switching frequencies $f_1$ and $f_2$ and data acquisition unit 126 subsequently generates the updated mixed PPG signals 140, light sources 106, photodetectors 112-114, ECG 116, drive circuit 110, and data acquisition unit 126 are collectively referred to as the "adaptive sensing hardware" 130 of the disclosed TFO system 100. It should be made clear that certain sensing hardware adjustments, such as changing photodetector placement locations, require manual intervention of an operator/clinician. The detailed processes and operations of signal processing subsystem 120 are described in more detail below.

TFO Estimations without Fetal Signal Extraction

Figure 2:
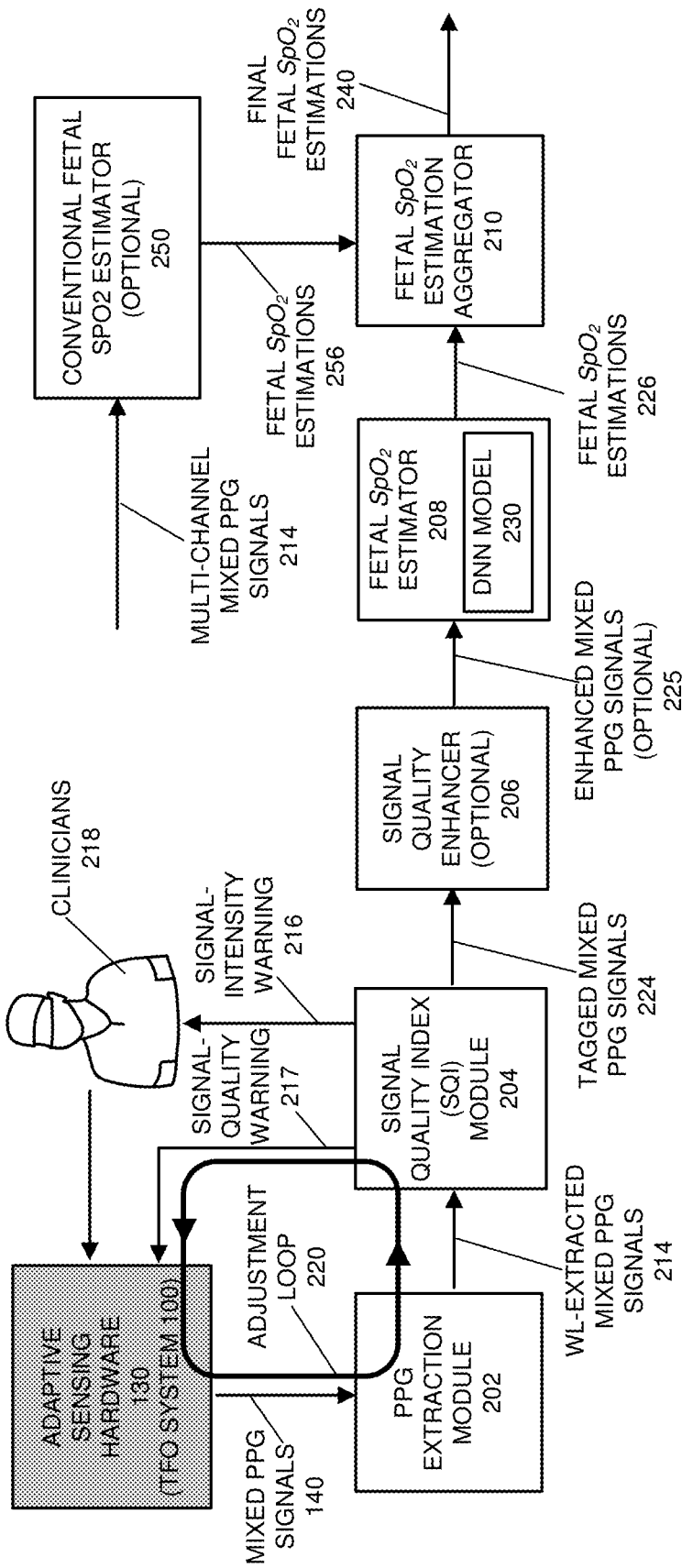
FIG. 2 illustrates a block diagram of the disclosed photoplethysmogram (PPG) signal processing subsystem in the disclosed TFO system in accordance with the disclosed embodiments.

FIG. 2 illustrates a block diagram of the disclosed PPG signal processing subsystem 120 in TFO system 100 in accordance with the disclosed embodiments. As can be seen in FIG. 2, signal processing subsystem 120 includes a PPG-extraction module 202, a signal quality index module 204, a signal quality enhancer 206, a fetal $S_pO_2$ estimator 208, and an estimation aggregator 210, which are coupled in the order shown. Note that among these modules of the disclosed signal processing subsystem 120, signal quality enhancer 206 is an optional module.

In some embodiments, PPG extraction module 202 of signal processing subsystem 120 is coupled to adaptive sensing hardware 130 of TFO system 100 to receive mixed PPG signals 140, which include at least two mixed PPG signals at two different distinct wavelengths $\lambda_1$ and $\lambda_2$. Note that the block indicating adaptive sensing hardware 130 is purposely shown in grey to indicate that the block is not part of signal processing subsystem 120 (but it is included in FIG. 2 for the convenience of discussion). As mentioned above, the two light sources in adaptive sensing hardware 130 are modulated on and off at two distinct switching frequencies $f_1$ and $f_2$. Hence, PPG extraction module 202 can be configured to separate the received mixed PPG signals 140 into two separate channels of PPG signals based on the switching frequencies $f_1$ and $f_2$. For example, PPG extraction module 202 can use two band-pass filters with respective center frequencies of $f_1$ and $f_2$ to separate each channel of PPG signals at a given switching frequency $f_1$ or $f_2$. As a result, PPG extraction module 202 outputs wavelength-extracted mixed PPG signals 214 (or "WL-extracted mixed PPG signals 214," or simply "mixed PPG signals 214"), wherein one channel in WL-extracted mixed PPG signals 214 corresponds to wavelength $\lambda_1$ and the other channel corresponds to $\lambda_2$.

More generally, when more than two wavelengths of probe lights are used, PPG extraction module 202 outputs multiple WL-extracted channels of mixed PPG signals 214, wherein each WL-extracted channel of mixed PPG signal 214 corresponds to one of the two or more wavelengths. Note that each wavelength channel of WL-extracted PPG signals 214 remains a mixed PPG signal because it is a combined signal of PPG signals 122-124 captured by the multiple detectors. Note that separating the raw mixed PPG signals into multiple WL-extracted channels of mixed PPG signals is meaningful because each WL-extracted channel of mixed PPG signal associated with a distinct source wavelength, e.g., $\lambda_1$ or $\lambda_2$, has different oxy- and deoxy-hemoglobin ($HbO_2$ and $Hb$) absorption properties from other WL-extracted channels.

In some embodiments, signal quality index (SQI) module 204 of signal processing subsystem 120 receives WL-extracted mixed PPG signals 214 at multiple switching frequencies such as $f_1$ and $f_2$. Generally speaking, SQI module 204 is configured to perform a number of signal quality evaluations on WL-extracted mixed PPG signals 214 to evaluate the qualities of the raw PPG signals, and optionally provide feedback to adaptive sensing hardware 130 and/or an operator/clinician to cause adjustments to one or more TFO sensing configurations, such as the probe lights 106 or the detectors 112-114.

In some embodiments, SQI module 204 can perform a signal intensity check on the mixed PPG signals 214. If the signal intensity is determined to be above a certain intensity threshold, it can be an indication that one or more of the photo detectors 112-114 within adaptive sensing hardware 130 have come off of the skin and captured the ambient light. On the other hand, if the signal intensity is determined to be too low, e.g., when it is below another intensity threshold, it can be an indication that the photo detector 113 is placed too far from the fetus. Hence, if unusually high or low signal intensity is detected, SQI module 204 can send signal-intensity warning 216 directly to a clinician 218 performing the TFO measurements to check and make adjustments to the photo detector placements.

In some embodiments, adaptive sensing hardware 130 and SQI module 204 can be used collectively to determine a light intensity for light sources 106 as one of the optimal operating conditions of TFO system 100. Specifically, light intensity at light sources 106 can be varied from a safe maximum level and gradually reduced. At each new light intensity level, SQI module 204 determines the signal qualities of mixed PPG signals 214 by recomputing the SQI values. The process continues until the smallest light intensity that does not degrade SQI is found, which is then selected as the light intensity setting for light sources 106 for optimal/nominal TFO measurement configurations.

In some embodiments, SQI module 204 is configured to perform frequency domain analysis on WL-extracted mixed PPG signals 214. Specifically, SQI module 204 can perform frequency domain transformation, such as Fast Fourier Transform (FFT) on each wavelength channel of the time-series mixed signals 214 to obtain the frequency spectra of the time series mixed signals. Next, a number of frequency domain analyses can be performed on the frequency spectra to evaluate the qualities of the raw mixed PPG signals 214, including identifying peaks corresponding a number of physiological properties.

Note that raw PPG signals can be considered as high frequency carriers that are amplitude modulated by a number of physiological properties including, but not limited to maternal respiration rates (RR), maternal heart rates (MHR), and fetal heart rates (FHR). Ideally, all three of the physiological properties RR, MHR, and FHR will have corresponding peaks in the corresponding frequency spectrum at the corresponding characteristic frequencies. Note that a high quality mixed PPG signal 214 means that these peaks in the frequency spectrum of the time-series signal will have high contrast to other frequencies in the frequency spectrum of the signal. In other words, the signal levels at these characteristic frequencies should be significantly higher than the baseline levels in the spectrum (i.e., the noise levels). However, for a given channel of WL-extracted mixed PPG signal 214, if the contrast between the signal levels at the characteristic frequencies and the baseline level is low (i.e., the overall frequency spectrum has a relatively uniform energy distribution), SQI module 204 can generate an SQI="Weak" label to the channel of mixed PPG signal 214 indicating that the quality of the given channel of mixed PPG signal 214 is poor/low.

In some embodiments, if the signal qualities of the mixed raw signal 214 are determined to be low based on the above-described frequency domain analysis, SQI module 204 can generate a signal-quality warning 217 and send it as a feedback to adaptive sensing hardware 130 to cause adjustments to the sensing hardware configurations, such as by adjusting one or both of the probe light switching frequencies $f_1$ and $f_2$. Note that different wavelength channels of the mixed PPG signals 214 corresponding to different switching frequencies $f_1$ and $f_2$ can be evaluated independently in the frequency domain and the determined signal qualities through spectrum analyses can be different for different channels. As such, each of the two switching frequencies $f_1$ and $f_2$ may be independently adjusted.

In some embodiments, prior to performing the frequency domain analysis using SQI module 204, adaptive sensing hardware 130 can be used to determine initial switching frequencies $f_1$ and $f_2$ for light sources 106 to achieve optimal signal-to-noise ratios (SNRs) for the mixed PPG signals 214. To do so, outputs of photo detectors 112-114 (while positioned on the patient) are measured while light sources 106 are turned off. This allows the "dark noise" profile of the photo detectors to be determined. Next, light sources 106 are turned back on, and the switching frequencies $f_1$ and $f_2$ are varied to determine those switching frequencies $f_1$ and $f_2$ that optimize SNRs for each probe light at respective wavelengths $\lambda_1$ and $\lambda_2$. The determined frequencies $f_1$ and $f_2$ achieving the optimal SNRs can then be selected as the initial frequencies $f_1$ and $f_2$ light sources 106 for optimal/nominal TFO measurement configurations.

A person skilled in the art can appreciate that the above described SQI module 204, the feedback mechanism between SQI module 204 and adaptive sensing hardware 130 (i.e., the warnings 216 and 217), adaptive sensing hardware 130, and PPG extraction module 202 operate as an adjustment loop 220 to adaptively improve the signal quality of mixed PPG signals 214. Through adjustment loop 220, signal processing subsystem 120 can continue improving the quality of the mixed PPG signal 214 until the computed SQI value for each wavelength channel of the mixed signal 214 is no longer rated "Weak" by SQI module 204.

In some embodiments, after the mixed PPG signals 214 is no longer rated "Weak" by SQI module 204, SQI module 204 is further configured to compare the FHR identified from the mixed PPG signals 214 through the frequency domain analysis with FHR measured by ECG 116 (part of the adaptive sensing hardware 130). In some embodiments, if the FHR value obtained from the PPG signals 214 does not match the FHR obtained using ECG 116, or if the FHR value cannot be detected by ECG 116, SQI module 204 is configured to generate an SQI="Medium" quality label for the mixed PPG signals 214. On the other hand, if SQI module 204 determines that the mixed PPG signals 214 are not Weak and the PPG-based FHR value matches the ECG-based FHR value, SQI module 204 is further configured to generate an SQI="Good" quality label for the mixed PPG signals 214.

Note that practically speaking, SQI module 204 and adjustment loop 220 are primarily used during the initial setup and calibration phase of using TFO system 100. However, adjustment loop 220 can also be activated periodically during real-time fetal $S_pO_2$ monitoring phase of using TFO system 100 to recalibrate the sensing components to ensure PPG signal qualities are maintained throughout the fetal $S_pO_2$ monitoring phase. Otherwise, during the real-time fetal $S_pO_2$ monitoring phase of using TFO system 100, SQI module 204 is used in a feed-forward mode while adjustment loop 220 is deactivated. When SQI module 204 is used in the feed-forward mode to perform real-time fetal $S_pO_2$ estimations and monitoring, SQI module 204 can continue to perform various described SQI evaluations on the mixed PPG signals 214, e.g., using a window-based signal processing mode. This means that for each signal window and each wavelength channel of the real-time mixed PPG signal 214, SQI module 204 can generate one of the three SQI labels: "Weak," "Medium" and "Good" for the signal window. Because the downstream fetal $S_pO_2$ estimator 208 uses a deep-neural-network (DNN) based data processing approach, the generated SQI labels for each signal window of the real-time mixed PPG signal becomes a tag attached to the signal window. The windowed and tagged mixed PPG signals 224 are then passed downstream to signal quality enhancer 206 (optional) and fetal $S_pO_2$ estimator 208.

Figure 3:
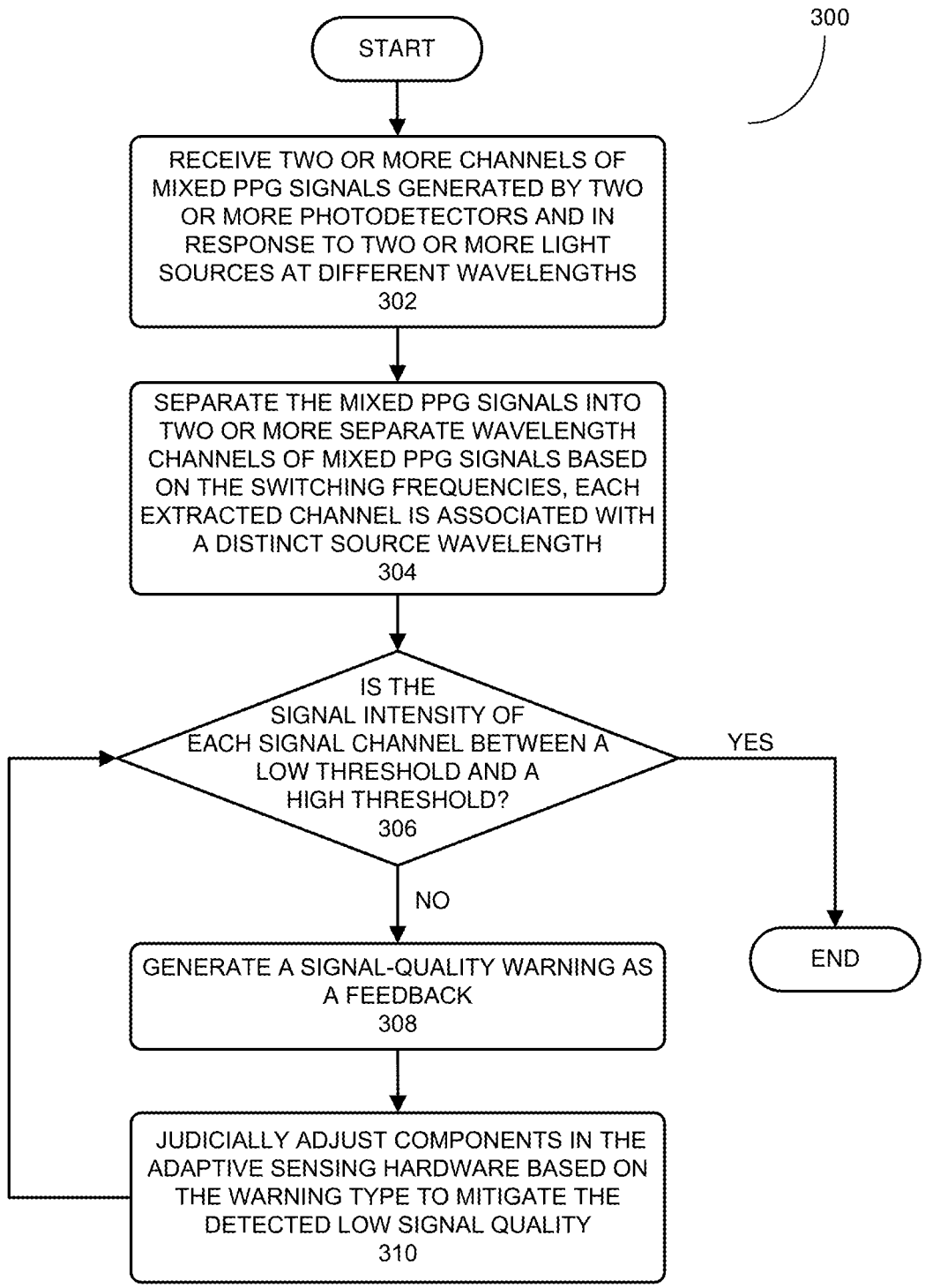
FIG. 3 presents a flowchart illustrating a process for adaptively adjusting sensing hardware configuration of the disclosed FTO system based on the measured mixed PPG signals in accordance with the disclosed embodiments.

FIG. 3 presents a flowchart illustrating a process 300 for adaptively adjusting sensing hardware configuration of FTO system 100 based on measured mixed PPG signals in accordance with the disclosed embodiments. Process 300 starts with receipt of two or more channels of mixed PPG signals 140 generated by two or more photodetectors placed on the maternal abdomen and in response to two or more light sources placed on the maternal abdomen emitting probe lights at different wavelengths (step 302). Note that each channel in the two or more channels of mixed PPG signals 140 includes contributions from both maternal tissues and fetal tissues. Also note that the two or more light sources are modulated on and off at two or more distinct switching frequencies.

The received multi-channel mixed PPG signals 140 are then separated into two or more separate wavelength channels of mixed PPG signals 214 based on the corresponding distinct switching frequencies (e.g., $f_1$ and $f_2$) wherein each extracted wavelength channel is associated with a distinct source wavelength $\lambda_1$, $\lambda_2$, etc. (step 304). Next, for, each channel of mixed PPG signal 214, it is determined whether the signal intensity is between a low intensity threshold and a high intensity threshold (step 306). Note that a signal intensity above the high intensity threshold is generally an indication that one or more of the photo detectors 112-114 have come off of the skin and captured the ambient light, whereas a signal intensity below the light intensity threshold is an indication that the photodetector responsible for capturing TFO maternal-fetal signals (e.g., photodetector 113) is placed too far from the fetus. If it is determined that the signal intensity of each channel of mixed PPG signals 214 is within the range between the high intensity threshold and the low intensity threshold, the adaptive adjustments of the sensing hardware configuration is complete.

If it is determined that the signal intensity of any channel of mixed PPG signals 214 is outside of the range between the high intensity threshold and the low intensity threshold, a signal-quality warning is generated as a feedback to the operators/clinicians operating FTO system 100 (step 308). Note that the signal-quality warning can also directly indicate whether the signal intensity if too high or too low. Next, based on the signal-quality warning type, components in the adaptive sensing hardware 130 are judiciously adjusted to mitigate the detected low signal quality, e.g., by changing a corresponding switching frequencies $f_1$ or $f_2$, changing the placement locations of one or more photodetectors 112-114, and/or changing the signal gains of one or more photodetectors 112-114 (step 310). After adjustments are made to adaptive sensing hardware 130, process 300 returns to step 306, wherein signal intensity levels are reevaluated at step 306 and further adjustments to adaptive sensing hardware 130 are made until each signal intensity level of each wavelength channel is within the desirable range.

Direct Fetal $S_2O_2$ Estimations

One distinction of the proposed FTO system 100 and the associated fetal $S_pO_2$ estimation technique is that the fetal $S_pO_2$ is directly inferred from the tagged mixed PPG signals 224 without the need to first extract the fetal-portion of the PPG signal (i.e., the fetal signal) from the mixed PPG signals prior to estimating the fetal $S_pO_2$. This direct fetal $S_pO_2$ estimation approach effectively eliminates all the obstacles commonly associated with fetal signal isolation/extraction from the mixed PPG signals, especially when the fetal signal within the mixed PPG signals is particularly weak.

As can be seen in FIG. 2, fetal $S_pO_2$ estimator 208 includes a trained DNN model 230, such as a convolutional neural network (CNN) model or a recurrent neural network (RNN) model, which directly receives tagged mixed PPG signals 224 from SQI module 204 and generates fetal $S_pO_2$ estimations 226 as outputs. Note that DNN model 230 was trained prior to performing the direct fetal $S_pO_2$ estimations on the patient. In some embodiments, training the DNN model 230 includes tuning a set of neural network (NN) parameters of the DNN model 230 on a group of patients with known fetal $S_pO_2$ values. In some embodiments, the training process is performed using the same sensing hardware configuration as adaptive sensing hardware 130.

Moreover, the model training process also uses SQI module 204 to generate SQI tags for the training data/samples, wherein the SQI tags are used as a weighting factor for the corresponding training data/samples. In some embodiments, training data/samples tagged with SQI="Good" label are assigned with a higher weight in training DNN model 230, training data/samples tagged with SQI="Medium" label are assigned with a lower weight in training DNN model 230, and data/samples tagged with SQI="Weak" label are not used for the model training operation.

Figure 4:
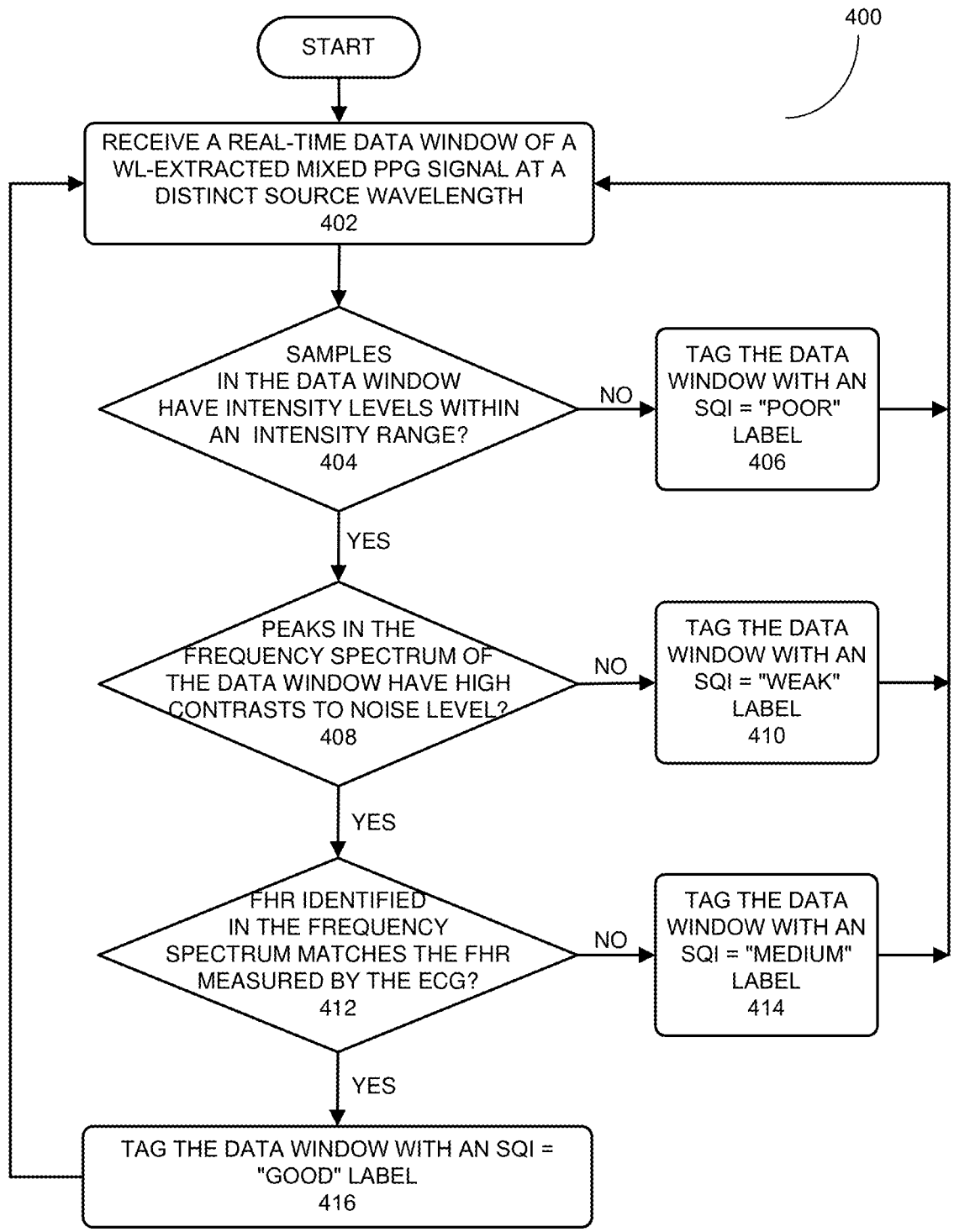
FIG. 4 presents a flowchart illustrating a process for tagging an extracted wavelength channel of real-time mixed PPG signal to generate the tagged mixed PPG signals for direct fetal $S_pO_2$ inferences in accordance with the disclosed embodiments.

FIG. 4 presents a flowchart illustrating a process 400 performed by SQI module 204 for tagging an extracted wavelength channel of real-time mixed PPG signal 214 to generate tagged mixed PPG signals 224 for direct fetal $S_pO_2$ inferences in accordance with the disclosed embodiments. Note that process 400 is generally performed by SQI module 204. Process 400 starts with receipt, at SQI module 204, of a real-time data window of a WL-extracted mixed PPG signal corresponding to a distinct source wavelength (step 402). Note that the data window has a predetermined time duration and includes a predetermined number of PPG data samples (or "samples").

Next, SQI module 204 performs a signal intensity check on the data window to determine if the samples in the data window have intensity levels within a predetermined intensity range (step 404). As described above in conjunction with FIG. 3, the predetermined intensity range can include a high signal intensity threshold and a low signal intensity threshold. If the intensity levels of the data window are outside of the predetermined intensity range, SQI module 204 tags the data window with an SQI="Poor" label (step 406), and process 400 returns to step 402 to receive and tag the next real-time data window.

Otherwise, if the intensity levels of the samples are within the predetermined range, SQI module 204 further performs a frequency domain analysis on the data window to determine if characteristic peaks in the frequency spectrum of the data window have high contrasts to the baseline levels in the spectrum (step 408). As mentioned above, the characteristic peaks correspond to one or more of maternal respiration rates (RR), maternal heart rates (MHR), and fetal heart rates (FHR). If the characteristic peaks do not have sufficiently high contrasts to the baseline levels, SQI module 204 tags the data window with SQI="Weak" label (step 410), and process 400 returns to step 402 to receive and tag the next real-time data window.

Otherwise, if the peaks exhibit sufficient contrast, SQI module 204 further compares the FHR identified from the frequency domain analysis with an FHR measured by the ECG within the adaptive sensing hardware 130 to determine whether the two FHR values match (step 412), and process 400 returns to step 402 to receive and tag the next real-time data window. If the PPG-based FHR value does not match the ECG-based FHR value, SQI module 204 tags the data window with an SQI="Medium" label (step 414), and process 400 returns to step 402 to receive and tag the next real-time data window. Otherwise, SQI module 204 tags the data window with an SQI="Good" label (step 416), and process 400 returns to step 402 to receive and tag the next real-time data window. In some embodiments, the set of SQI labels [Poor, Weak, Medium, and Good] is also associated with a set of values with increasingly larger weights.

In some embodiments, to increase fetal $S_pO_2$ inference accuracy of the trained DNN model 230, additional sources of data are included in the training of DNN model 230. These additional channels of data can include the ECG signals acquired by the ECG 116, and additional channels of physiological data acquired by existing clinical monitors, including but not limited to FHR, MHR, RR, maternal $S_pO_2$ and uterine contractions. However, when these additional channels of data are used in the training process, the same additional channels of data should also be acquired and processed along with real-time WL-extracted mixed PPG signals 214 during the real-time fetal $S_pO_2$ inferences using the trained DNN model 230 on a new patient.

In some embodiments, other than generating absolute fetal $S_pO_2$ estimations 226, fetal $S_pO_2$ estimator 208 can be configured to generate fetal $S_pO_2$ changes/variations from a baseline value fetal $S_pO_2$ level associated with a healthy fetus as outputs. As such, fetal $S_pO_2$ estimator 208 becomes fetal $S_pO_2$ change estimator 208'. Note that this fetal $S_pO_2$ change estimator 208' will include a trained DNN model 230' for generating fetal $S_pO_2$ change inferences. This means that training DNN model 230' includes tuning a set of NN parameters of DNN model 230' on a group of patients with known fetal $S_pO_2$ changes from the baseline fetal $S_pO_2$ level. Moreover, the measurement hardware setup in building the second DNN model can be identical to adaptive sensing hardware 130. At the time of deployment of fetal $S_pO_2$ change estimator 208', the trained DNN model 230' may be first "zeroed" on the baseline fetal $S_pO_2$ of the fetus before the onset of active phase of labor of the mother. In other words, fetal $S_pO_2$ change estimator 208' can be calibrated with respect to the healthy fetus before the labor to output substantially zero values. Hence, during the onset of the active phase of labor, fetal $S_pO_2$ change estimator 208' using trained DNN model 230' can accurately monitor any change from the baseline value of fetal $S_pO_2$ in real time.

Note that from assessing the fetal health-risk standpoint, estimating fetal $S_pO_2$ variations from the baseline $S_pO_2$ level can be equivalent or equally effective to estimating the absolute fetal $S_pO_2$ values. However, it can be significantly less labor-intensive to build the second DNN model for estimating fetal $S_pO_2$ variations than building DNN model 230 for estimating absolute fetal $S_pO_2$ values, because the latter is generally a more challenging deep-learning problem. This means that using deep learning data analytics to process multi-channel mixed PPG signals provides more flexibility and multiple options to assess fetal $S_pO_2$ than the conventional absolute fetal $S_pO_2$ estimation techniques.

As mentioned above, signal processing subsystem 120 can optionally include a conventional fetal $S_pO_2$ estimation module 250 which can receive the same mixed PPG signals 214 from PPG extraction module 202 and generate conventional fetal $S_pO_2$ estimations 256. Next, fetal $S_pO_2$ estimation aggregator 210 can receive both fetal $S_pO_2$ estimations 226 from DNN model 230 and conventional fetal $S_pO_2$ estimations 256 from conventional fetal $S_pO_2$ estimation module 250 and combine the two sets of fetal $S_pO_2$ estimations into final fetal $S_pO_2$ estimations 240. In some embodiments, fetal $S_pO_2$ estimation aggregator 210 can compute final fetal $S_pO_2$ estimations 240 as a weighted average of fetal $S_pO_2$ estimations 226 and fetal $S_pO_2$ estimations 256. In particular, because each fetal $S_pO_2$ estimation 226 generated by DNN model 230 has an associated confidence level, the contribution of the fetal $S_pO_2$ estimation 226 within each final fetal $S_pO_2$ estimation 240 can be weighted by the associated confidence level of the fetal $S_pO_2$ estimation 226. Alternatively, the contribution of the fetal $S_pO_2$ estimation 226 within each final fetal $S_pO_2$ estimation 240 can be weighted by the SQI value associated with the tagged mixed PPG signals 224 used to computer the fetal $S_pO_2$ estimation 226.

In some embodiments, fetal $S_pO_2$ estimation aggregator 210 can also make comparisons between fetal $S_pO_2$ estimations 226 and fetal $S_pO_2$ estimations 256. If the difference between a pair of corresponding fetal $S_pO_2$ estimation 226 and estimation 256 is greater than a threshold difference percentage, fetal $S_pO_2$ estimation aggregator 210 is also configured to reject one or both of the fetal $S_pO_2$ estimation 226 and estimation 256.

We now turn to the other optional block within signal processing subsystem 120, i.e., signal quality enhancer 206. In some embodiments, multiple consecutive windows of tagged mixed PPG signals 224 can receive "Weak" SQI labels during real-time fetal $S_pO_2$ estimations. Signal quality enhancer 206 can be configured to detect such a scenario. When consecutive windows of weak PPG signals are detected, signal quality enhancer 206 can be activated to compute enhanced data windows from the consecutive windows of weak mixed PPG signals, and output the computed enhanced mixed PPG signals 225 to replace the consecutive windows of weak mixed PPG signals 224.

In some embodiments, to compute the enhanced data mixed PPG signals 225, a set of "averaging" windows over the set of consecutive data windows of weak signals is determined. More specifically, an averaging window can have a predetermined length of 2L samples, and have the fundamental property that the signal value at position L is smaller than the signal value at position L+1. Note that these averaging windows may overlap. Next, all of the determined averaging windows are averaged to obtain a representative waveform with a length of 2L samples. From the representative waveform, enhanced mixed PPG signals are selected and outputted as enhanced mixed PPG signals 225.

Note that the above averaging operation can enhance weak PPG signals by averaging out the noise, thereby increasing the SNRs. Note also that this averaging operation on the set of averaging windows of the weak PPG signals can include providing increasingly lower weights to increasingly older signal windows. Alternatively, the averaging operation provides the same weight for the set of averaging windows of the weak PPG signals. Generally speaking, signal quality enhancer 206 is activated only when low-quality weak PPG signals persist longer than a predetermined duration. However, if no series of weak PPG signals 224 is detected, signal quality enhancer 206 can simply let tagged mixed PPG signals 224 pass through to fetal $S_pO_2$ estimator 208.

Note that the disclosed signal processing subsystem 120 may be implemented as electronic hardware, computer software, or combinations of both. To clearly illustrate this interchangeability of hardware and software, various illustrative components, blocks, modules, circuits, and steps of signal processing subsystem 120 have been described above generally in terms of their functionality. In some embodiments, signal processing subsystem 120 can be implemented within a processor, wherein the processor can include, but not limited to, a microprocessor, a graphic processing unit (GPU), a tensor processing unit (TPU), an intelligent processor unit (IPU), a digital signal processor (DSP), a field-programmable gate array (FPGA), and an application-specific integrated circuit (ASIC).

Figure 5:
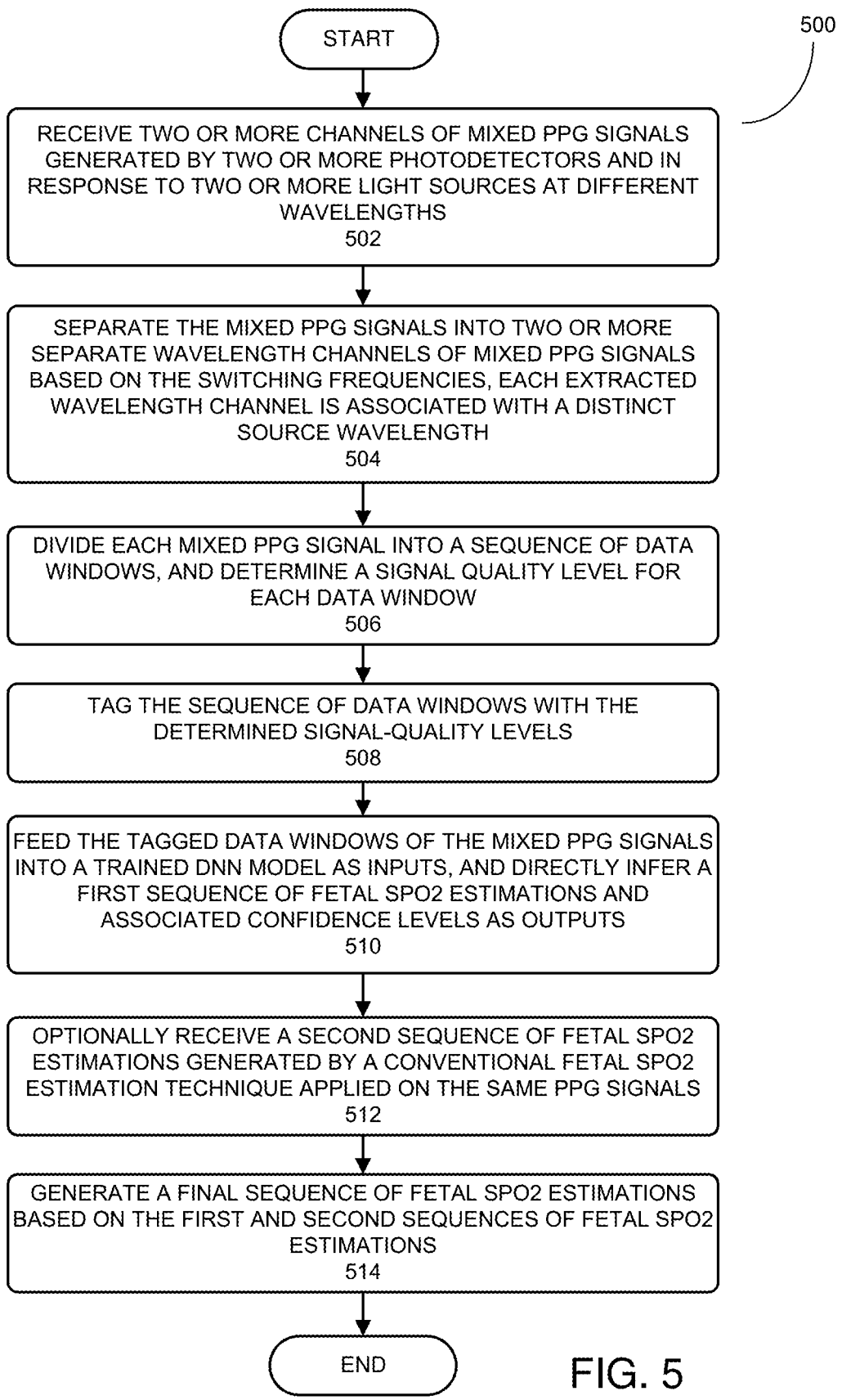
FIG. 5 presents a flowchart illustrating a data-driven deep-learning-based process for generating fetal $S_pO_2$ estimations based on measured mixed PPG signals in accordance with the disclosed embodiments.

FIG. 5 presents a flowchart illustrating a data-driven deep-learning-based process 500 for generating fetal $S_pO_2$ estimations based on measured mixed PPG signals in accordance with the disclosed embodiments. Process 500 starts with receipt of two or more channels of mixed PPG signals generated by two or more photodetectors placed on the maternal abdomen and in response to two or more light sources placed on the maternal abdomen emitting probe lights at different wavelengths (step 502). Note that each channel in the two or more channels of mixed PPG signals includes contributions from both maternal tissues and fetal tissues. Also note that the two or more light sources are modulated on and off at two or more distinct switching frequencies.

The received multi-channel mixed PPG signals are then separated into two or more separate wavelength channels of mixed PPG signals based on the corresponding distinct switching frequencies, wherein each extracted wavelength channel of mixed PPG signals is associated with a distinct source wavelength (step 504). Note that separating the raw mixed PPG signals into WL-extracted channels of mixed PPG signals is meaningful because each WL-extracted channel of mixed PPG signal associated with a distinct source wavelength has different oxy- and deoxy-hemoglobin ($HbO_2$ and Hb) absorption properties from other WL-extracted channels. Moreover, each wavelength channel of mixed PPG signal remains a mixed PPG signal comprising both maternal signals and mixed maternal-fetal signals.

After extracting wavelength channels, each mixed PPG signal is divided into a sequence of data windows, and a signal quality level for each data window is subsequently determined (step 506). Note that each data window can include N predetermined data points/samples. Based on a determined signal-quality level among a set of predetermined signal-quality levels for each data window, the data window is tagged with the determined signal-quality level (step 508). In some embodiments, the set of predetermined signal-quality levels includes at least the following three levels: "Weak;" "Medium;" and "Good." However, other embodiments can use more than three signal-quality levels, such as the data tagging process 400 described in conjunction with FIG. 4.

Next, the tagged data windows of the WL-extracted mixed PPG signals are fed into a trained DNN model as inputs, and a first sequence of fetal $S_pO_2$ estimations and confidence levels associated with the fetal $S_pO_2$ estimations are generated as outputs (step 510). Note that the DNN model was trained on a group of patients with known fetal $S_pO_2$ values and under the same sensing configuration as the real-time fetal $S_pO_2$ sensing configuration, wherein the training process applies the same set of signal-quality tags to the training data/samples.

Next, a second sequence of fetal $S_pO_2$ estimations generated using a conventional fetal $S_pO_2$ estimation technique applied on the same multi-channels mixed PPG signals may be received (step 512). A final sequence of fetal $S_pO_2$ estimations is generated as the weighted average of the first and second sequences of fetal $S_pO_2$ estimations (step 514). In some embodiments, the contribution from the first sequence of fetal $S_pO_2$ estimations within the final sequence of fetal $S_pO_2$ estimations is weighted by the associated confidence levels of the first sequence of fetal $S_pO_2$ estimations. Note that the process of generating the first sequences of fetal $S_pO_2$ estimations using the DNN model does not require performing fetal signal extraction from the multi-channels mixed PPG signals. In contrast, using the conventional fetal $S_pO_2$ estimation technique to generate the second sequences of fetal $S_pO_2$ estimations requires performing fetal signal extraction from the multi-channels mixed PPG signals.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for estimating fetal blood oxygen saturation, comprising:
    receiving photoplethysmogram (PPG) signals from two or more photodetectors detecting transabdominal diffused light from two or more light sources emitting two or more distinct wavelengths when the two or more photodetectors and the two or more light sources are positioned on a maternal abdomen, wherein the PPG signals include mixed maternal-fetal PPG signals, and wherein each of the two or more light sources is modulated on and off at a distinct switching frequency different from other switching frequencies used to modulate other light sources;
    adjusting the two or more photodetectors and/or the two or more light sources based on qualities of the received PPG signals until the qualities are between upper and lower thresholds; and
    processing the received PPG signals using a deep neural network trained on a set of PPG training samples to directly estimate fetal blood oxygen saturation.

2. The method of claim 1, wherein prior to processing the received PPG signals, the method further comprises extracting two or more channels of PPG signals from the received PPG signals based on the corresponding switching frequencies, wherein each extracted channel of PPG signals is associated with one of the two or more distinct wavelengths.

3. The method of claim 2, wherein after extracting the two or more channels of PPG signals, the method further comprises:
    dividing each of the two or more channels of PPG signals into a sequence of data windows; and
    determining a signal quality level among a set of predetermined signal-quality levels for each data window in the sequence of data windows, wherein the set of predetermined signal-quality levels includes at least the following three levels: "Weak," "Medium," and "Good".

4. The method of claim 3, wherein the deep neural network was trained on a group of patients with known fetal-blood-oxygen-saturation values and using the same transabdominal fetal pulse oximetry (TFO) sensing configuration as the TFO sensing configuration used to acquire the PPG signals, wherein training the deep neural network includes applying the same set of predetermined signal-quality levels as tags to the set of PPG training samples.

5. The method of claim 3, wherein prior to processing the received PPG signals using the deep neural network, the method further comprises tagging the sequence of data windows with the corresponding determined signal-quality levels.

6. The method of claim 5, wherein processing the received PPG signals using the deep neural network includes:
    feeding the tagged data windows of the two or more channels of PPG signals as inputs to the deep neural network; and
    directly inferring, by the deep neural network, a first sequence of fetal-blood-oxygen-saturation estimations and associated confidence levels corresponding to the first sequence of fetal oxygen saturation estimations as outputs.

7. The method of claim 6, wherein prior to feeding the tagged data windows to the deep neural network, the method further comprises:
    detecting that a set of consecutive data windows are tagged with a low signal-quality level among the set of predetermined signal-quality levels; and
    computing an average of the set of consecutive data windows as an enhanced input to the deep neural network to replace the set of consecutive data windows.

8. The method of claim 7, wherein computing the average of the set of consecutive data windows includes providing increasingly lower weights to increasingly older data windows in the set of consecutive data windows.

9. The method of claim 6, wherein the method further comprises:
    receiving a second sequence of fetal-blood-oxygen-saturation estimations corresponding to the sequence of tagged data windows generated using a conventional fetal-blood-oxygen-saturation estimation technique applied on the PPG signals; and
    generating a final sequence of fetal-blood-oxygen-saturation estimations corresponding to the sequence of tagged data windows by computing the weighted averages of the first sequence and second sequence of fetal-blood-oxygen-saturation estimations.

10. The method of claim 9, wherein computing the weighted average of the first sequence and second sequence of fetal-blood-oxygen-saturation estimations includes using the associated confidence levels of the first sequence of fetal-blood-oxygen-saturation estimations as weight factors to the first sequence of fetal-blood-oxygen-saturation estimations within the weighted averages.

11. The method of claim 9,
    wherein generating the first sequence of fetal-blood-oxygen-saturation estimations corresponding to the sequence of tagged data windows using the deep neural network does not require performing fetal signal extraction from the mixed PPG signals; and wherein generating the second sequence of fetal-blood-oxygen-saturation estimations corresponding to the sequence of tagged data windows using the conventional fetal-blood-oxygen-saturation estimation technique requires performing fetal signal extraction from the mixed PPG signals.

12. The method of claim 1, wherein processing the received PPG signals using the deep neural network to directly estimate fetal blood oxygen saturation includes using the deep neural network to directly infer, from the received PPG signals, changes in fetal-blood-oxygen-saturation level with respect to a baseline fetal-blood-oxygen-saturation level when the fetus is in a healthy state.

13. The method of claim 12, wherein prior to using the deep neural network to infer the changes in fetal-blood-oxygen-saturation level with respect to the baseline fetal-blood-oxygen-saturation level, the method further comprises calibrating the deep neural network based on the PPG signals received during the healthy state of the fetus before an active phase of labor of the mother until the deep neural network outputs substantially zero values.

14. The method of claim 1, wherein said adjusting the two or more photodetectors and/or the two or more light sources based on qualities of the received PPG signals until the qualities are between upper and lower thresholds comprises:
extracting two or more channels from the received PPG signals based on the switching frequencies of the two or more light sources, wherein each channel corresponds to one of the two or more distinct wavelengths;
dividing each of the two or more channels into a sequence of data windows; and
for each data window of each channel, determining a signal quality level of the data window that reflects a suitability of contents of the data window for estimating fetal blood oxygen saturation.

15. The method of claim 1, wherein said adjusting the two or more photodetectors and/or the two or more light sources based on qualities of the received PPG signals until the qualities are between upper and lower thresholds comprises one or both of:
automatically changing the switching frequencies of the two or more light sources and/or modifying gains of the two or more photodetectors; and
alerting a human operator to adjust placements of the two or more photodetectors.

16. A transabdominal fetal pulse oximetry (TFO) system, comprising:
a TFO sensing configuration configured to be positioned on a maternal abdomen, wherein the TFO sensing configuration further includes:
two or more light sources emitting two or more distinct wavelengths, wherein each of the two or more light sources is modulated on and off at a distinct switching frequency different from other switching frequencies used to modulate other light sources; and
two or more photodetectors detecting transabdominal diffused light from the two or more light sources; and
a TFO signal processing module coupled to the TFO sensing configuration and configured to:
receive photoplethysmogram (PPG) signals from the set of photodetectors, wherein the PPG signals include mixed maternal-fetal PPG signals;
facilitate adjustment of the two or more photodetectors and/or the two or more light sources based on qualities of the received PPG signals until the qualities are between upper and lower thresholds; and
process the received PPG signals using a deep neural network trained on a set of PPG training samples to directly estimate fetal blood oxygen saturation.

17. The TFO system of claim 16, wherein prior to processing the received PPG signals, the TFO signal processing module is further configured to extract two or more channels of PPG signals from the received PPG signals based on the corresponding switching frequencies, wherein each extracted channel of PPG signals is associated with one of the two or more distinct wavelengths.

18. The TFO system of claim 17, wherein after extracting the two or more channels of PPG signals, the TFO signal processing module is further configured to:
divide each of the two or more channels of PPG signals into a sequence of data windows; and
determine a signal quality level among a set of predetermined signal-quality levels for each data window in the sequence of data windows, wherein the set of predetermined signal-quality levels includes at least the following three levels: "Weak," "Medium," and "Good".

19. The TFO system of claim 18, wherein prior to processing the received PPG signals using the deep neural network, the TFO signal processing module is further configured to tag the sequence of data windows with the corresponding determined signal-quality levels.

20. The TFO system of claim 18, wherein the TFO signal processing module processes the received PPG signals using the deep neural network by:
feeding the tagged data windows of the two or more channels of PPG signals as inputs to the deep neural network; and
directly inferring, by the deep neural network, a first sequence of fetal-blood-oxygen-saturation estimations and associated confidence levels corresponding to the fetal oxygen saturation estimations as outputs.

21. The TFO system of claim 20, wherein the TFO signal processing module is further configured to:
receive a second sequence of fetal-blood-oxygen-saturation estimations corresponding to the sequence of tagged data windows generated using a conventional fetal-blood-oxygen-saturation estimation technique applied on the PPG signals; and
generate a final sequence of fetal-blood-oxygen-saturation estimations corresponding to the sequence of tagged data windows by computing the weighted averages of the first sequence and second sequence of fetal-blood-oxygen-saturation estimations.

22. The TFO system of claim 21, wherein the TFO signal processing module is further configured to compute the weighted average of the first and second sequences of fetal-blood-oxygen-saturation estimations by using the associated confidence levels of the first sequence of fetal-blood-oxygen-saturation estimations as weight factors to the first sequence of fetal-blood-oxygen-saturation estimations within the weighted averages.

23. The TFO system of claim 21,
wherein the TFO signal processing module is configured to generate the first sequence of fetal-blood-oxygen-saturation estimations using the deep neural network without performing fetal signal extraction from the mixed PPG signals; and
wherein the TFO signal processing module is configured to generate the second sequence of fetal-blood-oxygen-saturation estimations using the conventional fetalblood-oxygen-saturation estimation technique by performing fetal signal extraction from the mixed PPG signals.

24. The TFO system of claim 18, further comprising a model training module configured to train the deep neural network on a group of patients with known fetal-blood-oxygen-saturation values and using the same TFO sensing configuration as the TFO sensing configuration used to acquire the PPG signals, wherein the model training module is configured to train the deep neural network by applying the same set of predetermined signal-quality levels as tags to the set of PPG training samples.

25. The TFO system of claim 18, wherein prior to feeding the tagged data windows to the deep neural network, the TFO signal processing module is further configured to:

detect that a set of consecutive data windows are tagged with a low signal-quality level among the set of predetermined signal-quality levels; and compute an average of the set of consecutive data windows as an enhanced input to the deep neural network to replace the set of consecutive data windows.

26. The TFO system of claim 25, wherein the TFO signal processing module is configured to compute the average of the set of consecutive data windows by giving increasingly lower weights to increasingly older data windows in the set of consecutive data windows.

27. The TFO system of claim 16, wherein the TFO signal processing module is configured to process the received PPG signals by using the deep neural network to directly infer, from the received PPG signals, changes in fetal-blood-oxygen-saturation level with respect to a baseline fetal-blood-oxygen-saturation level when the fetus is in a healthy state.

28. The TFO system of claim 27, wherein prior to using the deep neural network to infer the changes in fetal-blood-oxygen-saturation level, the TFO signal processing module is further configured to calibrate the deep neural network based on the PPG signals received during the healthy state of the fetus before an active phase of labor of the mother until the deep neural network outputs substantially zero values.

29. An apparatus for transabdominal fetal pulse oximetry (TFO) measurements, comprising:

a TFO sensing configuration configured to be positioned on a maternal abdomen, wherein the TFO sensing configuration further includes:

two or more light sources emitting two or more distinct wavelengths, wherein each of the two or more light sources is modulated on and off at a distinct switching frequency different from other switching frequencies used to modulate other light sources; and two or more photodetectors detecting transabdominal diffused light from the two or more light sources; and a TFO signal processing module coupled to the TFO sensing configuration and configured to:

receive photoplethysmogram (PPG) signals from the set of photodetectors, wherein the PPG signals include mixed maternal-fetal PPG signals;

facilitate adjustment of the two or more photodetectors and/or the two or more light sources based on qualities of the received PPG signals until the qualities are between upper and lower thresholds; and process the received PPG signals using a deep neural network trained on a set of PPG training samples to directly estimate fetal blood oxygen saturation.

* * * * *